United States Patent
Eubank

[11] 3,995,446
[45] Dec. 7, 1976

[54] REVERSE AIR CYCLE AIR CONDITIONER

[76] Inventor: Marcus P. Eubank, P.O. Box 7576, Longview, Tex. 75601

[22] Filed: July 14, 1975

[21] Appl. No.: 595,337

[52] U.S. Cl. .............................. 62/325; 137/625.46
[51] Int. Cl.² .......................................... F25B 29/00
[58] Field of Search ................ 62/325; 137/625.46, 137/625.21

[56] References Cited
UNITED STATES PATENTS

| | | | |
|---|---|---|---|
| 2,401,560 | 6/1946 | Graham et al. | 62/325 X |
| 2,729,072 | 1/1956 | Dybvig | 62/325 |
| 2,975,611 | 3/1961 | Pietsch | 62/325 X |
| 2,984,087 | 5/1961 | Folsom | 62/325 |
| 3,084,522 | 4/1963 | Hames, Jr. et al. | 62/325 X |
| 3,143,864 | 8/1964 | Schordine | 62/325 |
| 3,517,527 | 6/1970 | Bouchat | 62/325 |

Primary Examiner—William E. Wayner
Assistant Examiner—William E. Tapolcai, Jr.
Attorney, Agent, or Firm—James C. Fails

[57] ABSTRACT

Disclosed herein is a reversible air cycle heat pump, or conditioner that provides cooling and heating options. A condenser plenum and an evaporator plenum are separated by a compartment. The compartment has a vertical partition transverse to the condenser and evaporator plenums. A single damper is carried horizontally within the compartment, and has a co-acting portion on either side of the partition. One end, or outdoor portion, of the compartment has outdoor discharge and suction chambers on either side of the partition. The other end, or indoor portion, of the compartment has indoor discharge and suction chambers on either side of the partition, with the damper dividing the indoor portion from the outdoor portion. Windows on one side of each of the condenser plenum and the evaporator plenum communicate with the compartment. The damper is pivotal about an axle axis carried transverse to the partition. Rotation can mutually and exclusively place the condenser and evaporator plenums via their windows in the desired degree of communication with the outdoor portion or the indoor portion of the compartment.

10 Claims, 9 Drawing Figures

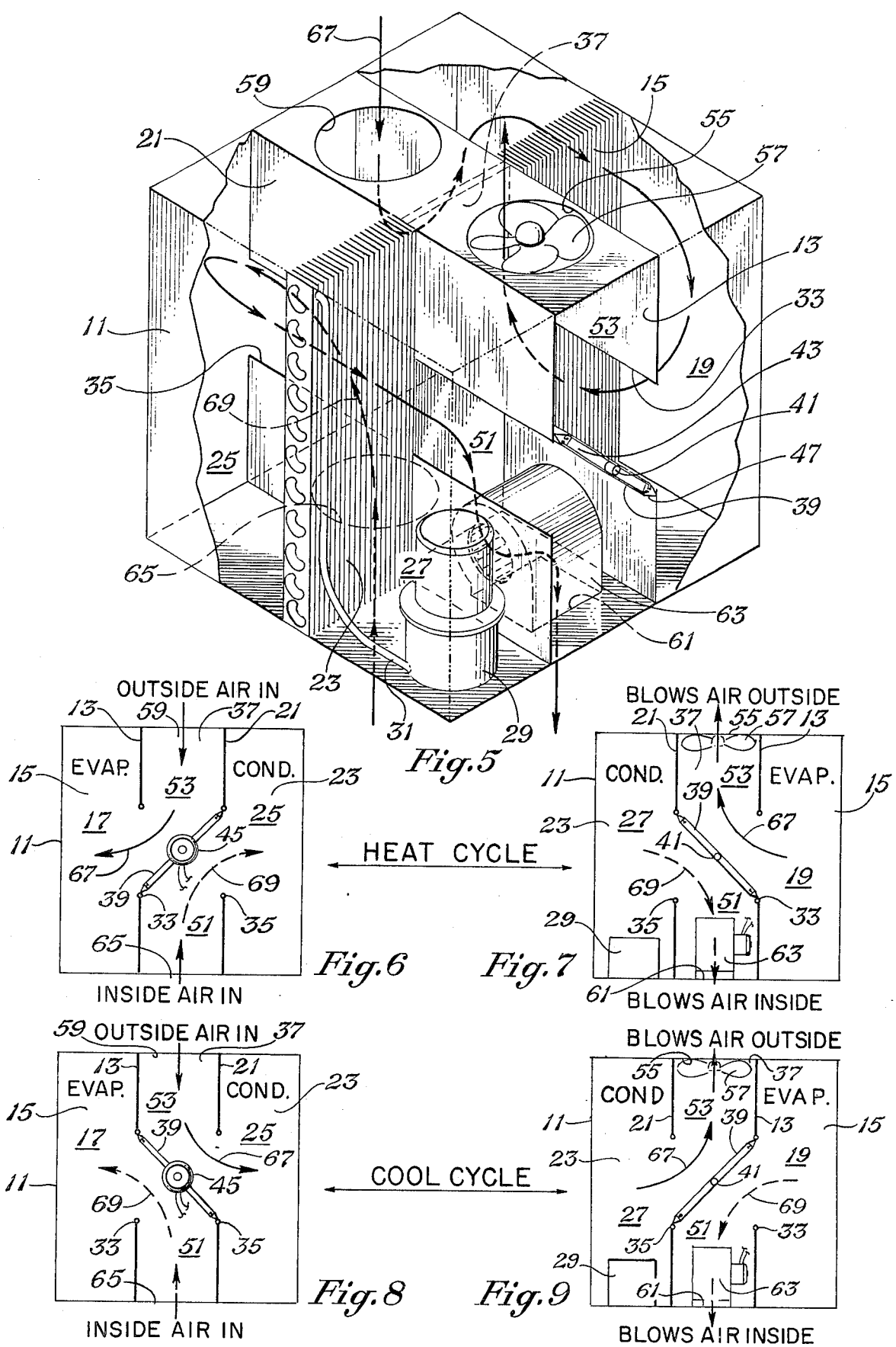

REVERSE AIR CYCLE AIR CONDITIONER

BACKGROUND OF THE INVENTION

1. Field of the Invention

This invention relates to air conditioners known as heat pumps; and, more particularly, to a reverse air cycle air conditioner that may be used for cooling or heating by redirecting air distribution.

2. Description of the Prior Art

There are two types of heat pumps, or air conditioners, that are used for heating as well as cooling. One type of heat pump reverses the refrigerant flow, thus the functions of the evaporator and condenser interchange. This type has disadvantages; including lack of a satisfactory reversing valve for the severe operating conditions, and current expense and maintenance caused thereby.

Another type of heat pump utilizes unidirection refrigerant flow wherein the condenser and evaporator retain their functions, but the air directed across them is redirected for different operations. While the heat pump is operating in the cooling mode, outdoor air is passed in heat exchange relationship with the condenser for liquefying the refrigerant and outside again; and indoor air is passed in heat exchange relationship with the evaporator for cooling the air and circulated again. Conversely, in the heating mode, outdoor air is passes in heat exchange relationship with the evaporator for vaporizing the refrigerant, then outside again; and indoor air is passed in heat exchange relationship with the condenser for heating the air and circulated again.

Many of the devices utilizing the latter principle have the disadvantage of requiring several dampers to redirect the flow. Each damper must have seals and control means. Other improvements also are desirable.

SUMMARY OF THE INVENTION

It is accordingly an object of this invention to provide an improved air conditioner which will interchange between heat and cool functions by redirecting airflow. It is a further object of this invention to provide a reverse air cycle air conditioner of simple construction that utilizes a single damper that directs air in only one direction across the condenser and evaporator.

In accordance with these objects, an air conditioner is provided that utilizes a condenser plenum and an evaporator pienum separated by a compartment. The compartment has suction and discharge apertures for indoor air on one end, referred to as the indoor portion, and suction and discharge apertures for outdoor air on the other end, referred to as the outdoor portion. A single damper, having co-acting portions, on the discharge and suction sides, is carried within the compartment and separates the indoor portion from the outdoor portion. A "cool" position of the damper communicates the condenser plenum with the outdoor portion and apertures of the compartment, and the evaporator to the indoor portion and apertures of the compartment. A "heat" position of the damper communicates the condenser and evaporator reversely. Other objects, features and advantages will become apparent hereinafter.

BRIEF DESCRIPTION OF THE DRAWINGS

FIG. 5 is an isometric view taken from a point near the compressor af the air conditioner of FIG. 1, shown with the damper in a different position.

FIG. 6 is a side elevational view of the air conditioner of FIG. 1, viewed from the side of the damper motor.

FIG. 7 is a side elevational view of the air conditioner of FIG. 1, viewed from the side opposite the damper motor.

FIG. 8 is a view of FIG. 6 with the damper in another position.

FIG. 9 is a view of FIG. 7 with the damper in the other position of FIG. 8.

DESCRIPTION OF THE PREFERRED EMBODIMENT

Figure 1:
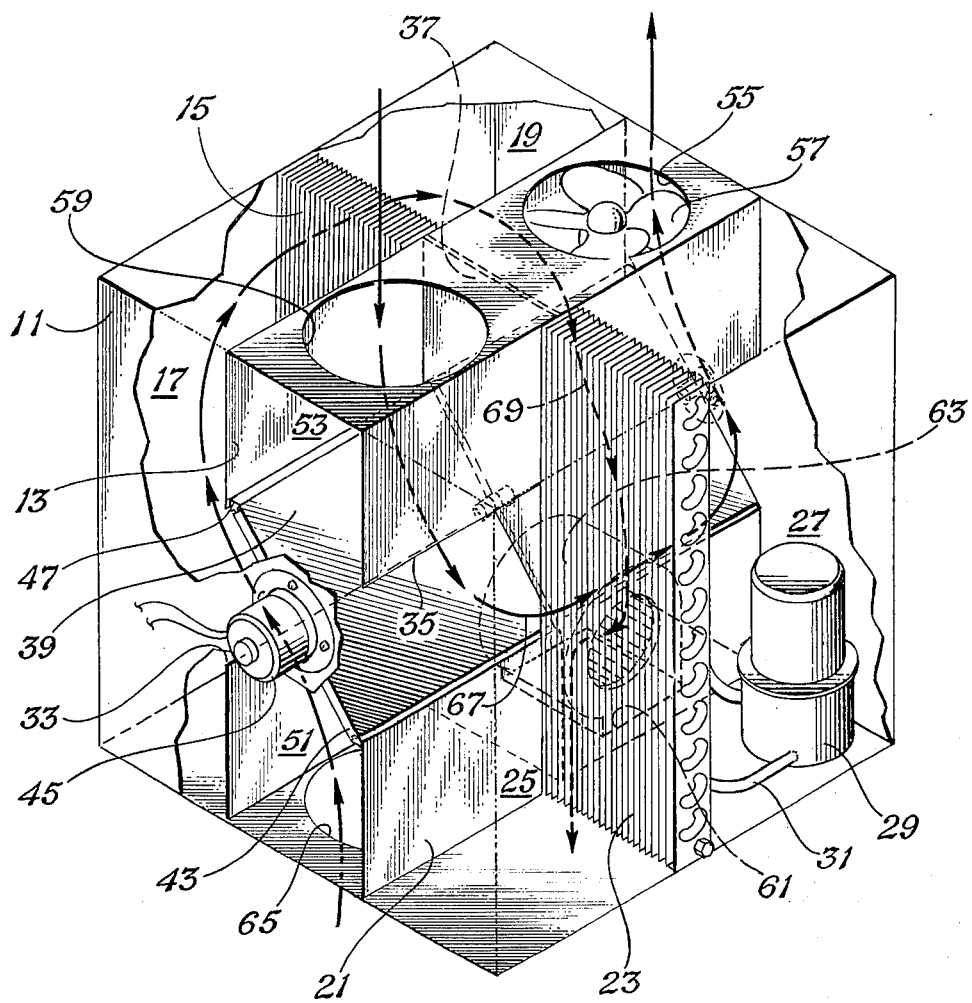
FIG. 1 is an isometric view of an air conditioner improved in accordance with this invention, with part of the housing removed and only outlined for clarity.

An air conditioner accordance with this invention and designed for roof mounting is shown in FIG. 1 in its "cool" position for cooling mode. A housing 11 is shown partly broken away by dotted lines as a rectangular enclosure. A vertical partition 13 is within housing 11 transverse to one of the sides.

Partition 13 and housing 11 define an enclosed compartment designated the evaporator plenum. As evaporator 15 is mounted within the evaporator plunum, shown in a vertical position in the drawing. Evaporator 15 is sealed to the top and bottom side walls of the housing and the partition 13, defining inlet and outlet chambers on either side, designated as 17 and 19.

A second partition 21 is formed within the housing parallel and separate from partition 13. Partition 21 defines an enclosed compartment designated the condenser plenum. A condenser 23 is sealed within, defining inlet and outlet chambers 25, 27.

A compressor 29 is mounted within the condenser plenum and has suitable conduit 31 connecting the high pressure side to the condenser 23 and conduit (not shown) from the evaporator 15 to the low pressure side of the compressor.

Each partition 13, 21 has a rectangular mid-portion removed along their horizontal lengths, designated as windows 33, 35. Consequently the space between each partition 13, 21 has a window on either side.

Another vertical partition 37 is formed in the space between partition 13 and partition 21, perpendicular to partitions, 13, 21 and extending from one to the other. Partition 37 is located approximately midway from the sides of the housing 11. As illustrated, it is generally in the same vertical plane as the evaporator 15 and condenser 23. Partition 37 has no mid portion removed, thus divides windows 33, 35 in half. Partition 37 is sealingly connected with the respective evaporator 15 and condenser 23.

Figure 2:
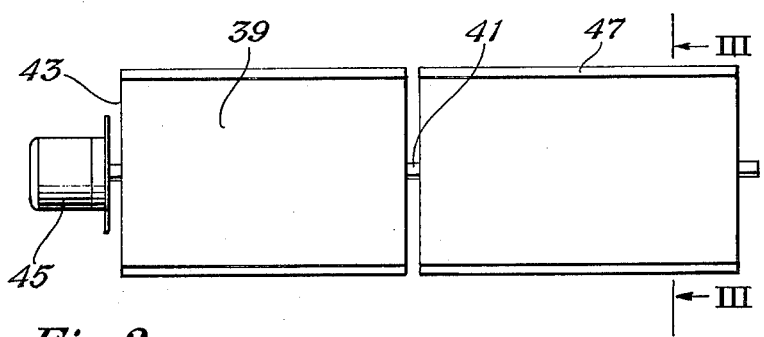
FIG. 2 is an elevational view of the damper of the air conditioner of FIG. 1.
Figure 3:
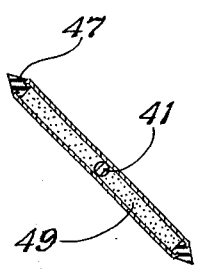
FIG. 3 is a vertical cross section of the damper shown in FIG. 2 taken along the line III—III.

A damper 39 having two co-acting blades, or portions, is carried by the housing 11 between partitions 13 and 21. An axle 41, FIGS. 2 and 3, is journalled in the housing 11, supports the damper 39 and is parallel to the partitions 13, 21 and windows 33, 35, and perpendicular to partition 37. Axle 41 is located on an longitudinal axis centered on the short or transverse sides 43 of damper 39. Axle 41 is inserted through a sealed hole (not shown) in partition 37 with an equal portion of damper 39 on each side of partition 37. Each half of damper 39 is coupled to axle 41 in a single common plane so that each is movable therewith. A motor 45 is attached to axle 41 and rotates the damper about the longitudinal axis coinciding with axle 41 between a position shown in FIG. 1 and a position shown in FIG. 5.

Damper 39 is of a size to extend between the upper edge of one window 33, 35 and lower edge of the adjacent window 33, 35 as shown in FIG. 1 and FIGS. 5–9. Resilient seals 47, FIG. 3, are fastened to each longitudinal edge of damper 39 to seal properly against partitions 13, 21. Damper 39 is well insulated to minimize heat transfer thereacross, and is illustrated as containing insulation material 49, FIG. 3.

Damper 39 divides horizontally the compartment or space between partitions 13, 21 into two compartments designated indoor subcompartment 51 and outdoor subcompartment 53. Indoor subcompartment 51, shown as the lower or bottom subcompartment in the drawing, is the portion directly in communication with the interior of the enclosure to be air conditioned. Outdoor subcompartment 53, shown as the upper or top subcompartment in the drawing, is directly in communication with the exterior atmosphere.

Each subcompartment 51, 53 is divided in two chambers by partition 37, designated discharge and suction chambers. The discharge chamber of the outdoor subcompartment 53 has an apreture 55 through which a fan 57 discharges air directly to the exterior atmosphere. The suction chamber of the outdoor subcompartment 53 has an aperture 59 through which air from the exterior atmosphere is drawn by fan 57 in the adjacent discharge chamber. Similarly the discharge chamber of the indoor subcompartment 51 has an aperture 61 and squirrel-cage blower 63 for discharging, or circulating, air to the interior to be conditioned. The suction chamber of the indoor subcompartment 51 has an aperture 65 through which return air from the interior of the enclosure to be conditioned is drawn by blower 63.

In a cool cycle, or cooling mode, operation as shown in FIG. 1 and FIGS. 8, 9, the co-acting portions of damper 39 extend from the upper edge of window 33 to the lower edge of window 35. Consequently condenser 23 is in communication with the outdoor subcompartment 53. Evaporator 15 is in communication with the indoor subcompartment 51, defined below damper 39. During this cycle the refrigerant fluid flows conventionally, under high pressure to condenser 23 where heat is removed from the refrigerant, liquefying it. Then the refrigerant flows through an expansion valve (not shown) into the evaporator where heat is added to air circulated therepast to become a low pressure gas as it enters the compressor.

As indicated by arrows 67, that indicate outdoor air, air is drawn by fan 55 from the outdoor atmosphere through suction aperture 59, then to inlet chamber 25. The air circulates through the coils of condenser 23 to outlet chamber 27, then back outdoors through discharge aperture 55 via window 35. The air removes heat from the liquid refrigerant as it is circulated past the condenser 23.

As indicated by arrows 69, that indicate indoor air, air is drawn by blower 63 from the indoor atmosphere through suction aperture 65 into inlet chamber 17. The air then circulates through the coils of evaporator 15, and back indoors through discharge aperture 61 via window 33. The air is cooled by the heat exchange with the liquid refrigerant, thereby supplying cool air to the indoor of the enclosure to be conditioned.

For a heat cycle, shown in FIGS. 5–7, the motor is actuated to rotate damper 39 to its heat cycle position. Damper 39 in that position seals against the upper edge of window 35 and lower edge of window 33. Consequently, condenser 23 is in communication with the indoor subcompartment 51, below damper 39, while evaporator 15 is in communication with the outdoor subcompartment 53, above damper 39.

As indicated by arrows 69, air is drawn by blower 63 from indoors through indoor suction aperture 65 and window 35 into the condenser plenum inlet chamber 25. Air is then circulated past condenser 23, warmed by it, then blown back indoors through aperture 61 by blower 63.

As indicated by arrows 67, outside air is drawn through outdoor suction aperture, 59, through window 33 into the inlet chamber 17 of the evaporator plenum. Air is circulated through the evaporator 15, then back into the outdoor subcompartment via window 33, then blown outward to the outdoor exterior through aperture 55 by fan 57. The outdoor air blown outward is cooler, having added heat to the refrigerant fluid.

Figure 4:
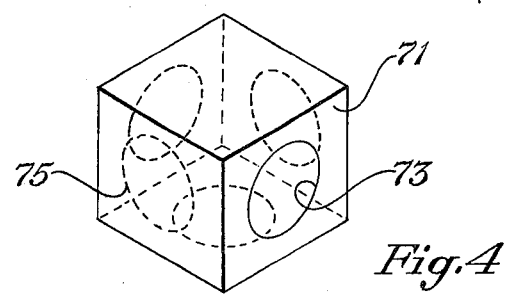
FIG. 4 is a schematic view of a typical discharge or suction chamber useful in the air conditioner of FIG. 1.

FIG. 4 shows a modified arrangement for the indoor or outdoor suction and discharge chamber. As taught in my patent U.S. Pat. No. 3,583,175, issued June 8, 1971, entitled "Universal Air Distribution Plenum for Air Conditioning Uhit", this universal arrangement allows air to be taken in and discharge through several directions. FIG. 4 represents one of the discharge or suction chambers, the four chambers being of similar configuration. Each chamber comprises a plurality of equally sized panels on the sides and on one end, carried by the frame (not shown) of the housing 11. The end of the chamber that directly faces the damper 39 remains open. One of the side or end panels has an aperture 73 for discharge or suction of air. The panels 71 are interchangeable with each other, thus the aperture could face in any of five directions as the dotted lines 75 show. Insulated ducting (not shown) could be attached to the aperture 71 and extend through its adjacent chamber if desired, providing both discharge and suction out of the same chamber.

Various modifications could be made to the air conditioning unit in the preferred embodiment such as reducing the size of the condenser or evaporator plenums. This may be accomplished by reducing the height of the evaporator 15 or condenser 23 and also by inclining them within their respective plenums. The outdoor subcompartment 53 could then be reduced in size to the level of the top damper 39. Resistive heat elements might also be located in the condenser plenum for additional heating on very cold days.

The materials ordinarily employed in construction of air conditioning units and cabinets may be employed with the air conditioner of this invention. Preferably, however, the panels and partitions between the chambers are thermally and accoustically insulated. It is desirable to attenuate the noise of the relatively high velocity of air flowing therethrough, and it is desirable to isolate, thermally, the partitions from each other. The acoustical and thermal insulation is readily supplied by known means; such as, by bonding glass wool, mineral wool, asbestos insulation or by spraying the asphaltic or asphaltic-asbestos undercoating commonly employed on automobiles, onto the air conditioner external housing and partitions. I have found that sheet metal panels are adequate and metal framework is preferred.

Ordinarily, the heat pump of this invention will be operated in either the heating mode or the cooling mode, as described hereinbefore. If desired, however, it can be operated in other modes, such as a fresh air circulation mode. In certain modes, the damper may be positioned in an intermediate position, such as horizontal, allowing mutual communication between all chambers. In such other modes, the compressor may be deenergized, alone or in conjunction with the condenser fan.

The terms "suction" and "discharge" chambers are employed herein to mean inlet and outlet chambers and do not imply that the particular fan or blower must be arranged as illustrated and described.

The "plenum" is employed herein in the sense of a chamber and does not necessarily connote that it is operative at super atmospheric pressure.

If desired, the directions of flow of air through the evaporator and condenser can be reversed, individually or collectively.

Axle 41 can be attached to damper blades as desired.

It can readily be seen that an invention having significant improvements has been provided. The reverse air cycle air conditioner of this invention utilizes a single co-acting damper to redirect air flow. Consequently, only a single motor is required for changing position, and minimum sealing is required. In either cycle the air passes through the condenser and evaporator in only one direction, thus avoiding problems of reversing airflow across the condenser and evaporator.

Although the invention has been described with a certain degree of particularity, it is understood that the present disclosure has been made only by example and that numerous changes in the details of construction of parts may be resorted to without departing from the spirit and the scope of this invention.

What is claimed is:

1. An air conditioning apparatus comprising:
   a housing;
   a first partition disposed within the housing to define in conjunction therewith a condenser plenum, said first partition containing a first partition window;
   a condenser housed within the condenser plenum and dividing the condenser into inlet and outlet chambers, each chamber being in communication with a portion of the first partition window;
   a second partition disposed within the housing, separate and substantially parallel to the first partition, to define an evaporator plenum; said second partition containing a second partition window;
   an evaporator housed within the evaporator plenum that divides the evaporator plunum into inlet and outlet chambers, each chamber being in communication with a portion of the second partition window;
   a third partition within the housing, in a plane transverse to the first and second partitions, that divides the space between the first and second partitions;
   a single damper carried sealingly between the first and second partitions, having two co-acting portions, one on either side of and sealingly engaging the third partition; said damper being pivotal about an axis transverse to the third partition to at least one of heat and cool positions;
   an indoor compartment defined by the space between the first and second partitions, the damper and the housing; said indoor compartment having discharge and suction chambers defined by the third partition therebetween; said indoor compartment being operable to be placed exclusively in communication through at least one of the first partition window with the condenser plenum, and the second partition window with the evaporator plenum, as the damper is in respective heat and cool positions;
   means for flowing air through the discharge chamber of the indoor compartment and in heat exchange relationship with at least one of the condenser and the evaporator;
   an outdoor compartment on the opposite side of the damper from the indoor chamber, defined by the space between the first and second partitions, the damper, and the housing; said outdoor compartment having discharge and suction chambers defined by the third partition therebetween; said outdoor compartment being operable to placed exclusively in communication through at least one of the first partition window with the condenser plenum, and the second partition window with the evaporator plenum, as the damper is in respective cool and heat positions; and
   means for flowing air through the discharge compartment of the outdoor chamber and in heat exchange relationship with at least one of the evaporator and the condenser.

2. The air conditioning apparatus according to claim 1 wherein
   the condenser and the evaporator are mounted in same plane as and on either side of the third partition.

3. The air conditioning apparatus according to claim 1 wherein
   the outdoor discharge and suction chamber is disposed on the top end, the indoor discharge and suction chambers are disposed on the bottom end, and the longitudinal axis of the damper is located in a horizontal plane.

4. The air conditioning apparatus according to claim 1 wherein the housing enclosing the indoor and outdoor compartments additionally includes a plurality of panel means including at least one panel means containing a suction aperture and at least one panel means containing a discharge aperture; said intake aperture, discharge aperture and said plurality of panel means being interchangeably positionable for orientation to effect intake and discharge of air in a plurality of directions.

5. The air conditioning apparatus according to claim 1 wherein the portion of the damper lie in a single plane.

6. The apparatus according to claim 5 wherein the damper is carried by and pivots around an axle located on a longitudinal axis of the damper centered on its transverse edge.

7. The air conditioning apparatus according to claim 1 wherein the damper contains insulating material and resilient seals.

8. The air conditioning apparatus according to claim 1 wherein the window is a rectangular mid-portion removed from the first and second partitions.

9. The air conditioning apparatus according to claim 1 wherein said respective means for flowing air through said evaporator and said condenser effect unidirectional flow of air therethrough.

10. A reverse air cycle air conditioning apparatus comprising:
- a first compartment defining a condenser plenum;
- a condenser sealed within the condenser plunum so that it divides the plenum into inlet and outlet chambers;
- a first window extending along a side wall of the first compartment into both inlet and outlet chambers;
- a second compartment defining an evaporator plunum;
- an evaporator sealed within the evaporator plenum so that it divides the plenum into inlet and outlet chambers;
- a second window extending along a side wall of the first compartment into both inlet and outlet chambers;
- a third compartment located between and connecting the first two compartments;
- a partition within the third compartment that divides the compartment transverse to the first and second windows;
- a damper carried within the third compartment transverse to the partition, said damper having two co-acting portions, one on either side of the partition;
- an outdoor subcompartment defined by a portion of the third compartment on one side of the damper; said outdoor subcompartment having an outdoor discharge aperture on one side of the partition and an outdoor suction aperture on the other side of the partition;
- means for supplying air through the outdoor discharge aperture in a unidirectional flow through either the condenser or the evaporator depending on either heat or cool position;
- an indoor subcompartment defined by a portion of the third compartment on the side of the damper opposite the outdoor subcompartment; said indoor subcompartment having an indoor discharge aperture on one side of the partition and an indoor suction aperture on the other side of the partition;
- means for supplying air through the indoor discharge aperture in a unidirectional flow through either the condenser or the evaporator depending on heat or cool position;
- said damper being pivotal about an axis transverse to the partition to provide mutually exclusive access from the condenser plunum and the evaporator plenum via the condenser window and evaporator window either to the indoor or outdoor subcompartments for cool or heat cycle.

\* \* \* \* \*